(12) United States Patent
Xu et al.

(10) Patent No.: US 12,160,504 B2
(45) Date of Patent: Dec. 3, 2024

(54) PRIVACY-PRESERVING FEDERATED LEARNING

(71) Applicant: International Business Machines Corporation, Armonk, NY (US)

(72) Inventors: Runhua Xu, Pittsburgh, PA (US); Nathalie Baracaldo Angel, San Jose, CA (US); Yi Zhou, Hefei (CN); Ali Anwar, San Jose, CA (US); Heiko H Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 16/682,927

(22) Filed: Nov. 13, 2019

(65) Prior Publication Data

US 2021/0143987 A1     May 13, 2021

(51) Int. Cl.
*H04L 9/08* (2006.01)
*G06N 20/00* (2019.01)

(52) U.S. Cl.
CPC ........... *H04L 9/0819* (2013.01); *G06N 20/00* (2019.01)

(58) Field of Classification Search
CPC ... H04L 9/0819; H04L 2209/46; G06N 20/00; G06N 3/098
See application file for complete search history.

(56) References Cited

U.S. PATENT DOCUMENTS

| | | | |
|---|---|---|---|
| 8,555,400 B2 * | 10/2013 | Shi | H04L 9/0833 380/278 |
| 10,033,702 B2 | 7/2018 | Ford et al. | |
| 10,043,035 B2 | 8/2018 | LaFever et al. | |
| 10,270,599 B2 | 4/2019 | Nadeau et al. | |

(Continued)

FOREIGN PATENT DOCUMENTS

| | | | | |
|---|---|---|---|---|
| CN | 109492420 A | | 3/2019 | |
| CN | 110378488 A | * | 10/2019 | ............. G06N 20/00 |

(Continued)

OTHER PUBLICATIONS

Gambs, Sébastien et al. "Scalable and Secure Polling in Dynamic Distributed Networks." 2012 IEEE 31st Symposium on Reliable Distributed Systems (2012): 181-190, DOI 10.1109/SRDS.2012.63 (Year: 2012).*

(Continued)

*Primary Examiner* — Alexander Lagor
*Assistant Examiner* — Joshua N Gonzales
(74) *Attorney, Agent, or Firm* — Patterson + Sheridan, LLP

(57) ABSTRACT

A plurality of public encryption keys are distributed to a plurality of participants in a federated learning system, and a first plurality of responses is received from the plurality of participants, where each respective response of the first plurality of responses was generated based on training data local to a respective participant of the plurality of participants and is encrypted using a respective public encryption key of the plurality of public encryption keys. A first (Continued)

aggregation vector is generated based on the first plurality of responses, and a first private encryption key is retrieved using the first aggregation vector. An aggregated model is then generated based on the first private encryption key and the first plurality of responses.

20 Claims, 8 Drawing Sheets

(56) References Cited

U.S. PATENT DOCUMENTS

| | | | | |
|---|---|---|---|---|
| 2011/0258430 | A1* | 10/2011 | Luukkala | H04L 9/3073 713/150 |
| 2012/0143922 | A1* | 6/2012 | Rane | G06F 21/6245 707/E17.005 |
| 2018/0097638 | A1* | 4/2018 | Haldenby | H04W 12/0433 |
| 2018/0101697 | A1* | 4/2018 | Rane | H04L 9/085 |
| 2020/0285980 | A1* | 9/2020 | Sharad | G06N 20/20 |
| 2020/0336292 | A1* | 10/2020 | Soriente | H04L 9/088 |

FOREIGN PATENT DOCUMENTS

| | | | | |
|---|---|---|---|---|
| WO | WO-2016048777 | A1 * | 3/2016 | H04L 9/008 |
| WO | WO-2018031597 | A1 * | 2/2018 | |
| WO | WO-2019116157 | A1 * | 6/2019 | G06Q 20/065 |
| WO | WO-2020061593 | A1 * | 3/2020 | H04L 63/0442 |

OTHER PUBLICATIONS

Shukla, Samiksha et al. "Secure multi-party computation protocol using asymmetric encryption." 2014 International Conference on Computing for Sustainable Global Development (INDIACom) (2014): 780-785, doi: 10.1109/IndiaCom.2014.6828069 (Year: 2014).*

Fisch, Ben, et al. "Iron: functional encryption using Intel SGX." Proceedings of the 2017 ACM SIGSAC Conference on Computer and Communications Security. 2017. (Year: 2017).*

Marc, Tilen, et al. "Privacy-enhanced machine learning with functional encryption." Computer SecurityâESORICS 2019: 24th European Symposium on Research in Computer Security, Luxembourg, September 23â27, 2019, Proceedings, Part I 24. Springer International Publishing, 2019. (Year: 2019).*

Jack Sullivan, "Secure Analytics: Federated Learning and Secure Aggregation," Oct. 15, 2018, 9 pages.

Disclosed Anonymously, "User-Behavior-Guided Dynamic Loaders in Embedded Operationg Systems," Nov. 28, 2018, IPCOM000256405D, 11 pages.

IBM, "Personal Data Traceability," Oct. 7, 2005, IPCOM000129766D, 12 pages.

Harvan et al., "Privacy-Preserving State Estimation and Prediction with Electricity Data," Jan. 6, 2016, IPCOM000244732D, 9 pages.

Bonawitz, "Practical Secure Aggregation for Privacy-Preserving Machine Learning," Cornell Tech, 21 pages.

Bonawtiz et al., "Towards Federated Learning at Scale: System Design," arXiv:1902.01046v2 [cs.LG] Mar. 22, 2019, 15 pages.

Abdalla, Michel, Florian Bourse, Angelo De Caro, and David Pointcheval. "Simple functional encryption schemes for inner products." In IACR PKC, pp. 733-751. Springer, Berlin, Heidelberg, 2015.

Nicolas Papernot, Shuang Song, Ilya Mironov, Ananth Raghunathan, Kunal Talwar, and Úlfar Erlingsson. 2018. Scalable private learning with PATE, In Proceedings of the 2018 Sixth International Conference on Learning Representations. arXiv preprint arXiv:1802. 08908.

Theo Ryffel, Andrew Trask, Morten Dahl, Bobby Wagner, Jason Mancuso, Daniel Rueckert, and Jonathan Passerat-Palmbach. 2018. A generic framework for privacy preserving deep learning. In Proceedings of Privacy Preserving Machine Learning Workshop with NeurIPS 2018.

Reza Shokri and Vitaly Shmatikov. 2015. Privacy-preserving deep learning. In Proceedings of the 22nd ACM SIGSAC conference on computer and communications security. ACM, ACM, 1310-1321.

Stacey Truex, Nathalie Baracaldo, Ali Anwar, Thomas Steinke, Heiko Ludwig, and Rui Zhang. 2018. A Hybrid Approach to Privacy-Preserving Federated Learning. arXiv preprint arXiv:1812. 03224 (2018).

Michel Abdalla, Dario Catalano, Dario Fiore, Romain Gay, and Bogdan Ursu. 2018. Multi-input functional encryption for inner products: function-hiding realizations and constructions without pairings. In Annual International Cryptology Conference. Springer, Springer, 597-627.

Martin Abadi, Andy Chu, Ian Goodfellow, H Brendan McMahan, Ilya Mironov, Kunal Talwar, and Li Zhang. 2016. Deep learning with differential privacy. In Proceedings of the 2016 ACMSIGSAC Conference on Computer and Communications Security. ACM, ACM, Vienna, Austria, 308-318.

Accountability Act. 1996. Health insurance portability and accountability act of 1996. Public law 104 (1996), 191.

Joseph A. Akinyele, Christina Garman, Ian Miers, Matthew W. Pagano, Michael Rushanan, Matthew Green, and Aviel D. Rubin. 2013. Charm: a framework for rapidly prototyping cryptosystems. Journal of Cryptographic Engineering 3, 2 (2013), 111-128. https://doi.org/10.1007/s13389-013-0057-3.

Peter Bogetoft, Dan Lund Christensen, Ivan Damgård, Martin Geisler, Thomas Jakobsen, Mikkel Krøigaard, Janus Dam Nielsen, Jesper Buus Nielsen, Kurt Nielsen, Jakob Pagter, et al. 2009. Secure multiparty computation goes live. In International Conference on Financial Cryptography and Data Security. Springer, 325-343.

Keith Bonawitz, Vladimir Ivanov, Ben Kreuter, Antonio Marcedone, H Brendan McMahan, Sarvar Patel, Daniel Ramage, Aaron Segal, and Karn Seth. 2017. Practical secure aggregation for privacy-preserving machine learning. In Proceedings of the 2017 ACM SIGSAC Conference on Computer and Communications Security. ACM, ACM, 1175-1191.

Dan Boneh and Matt Franklin. 2001. Identity-based encryption from the Weil pairing. In Annual international cryptology conference. Springer, 213-229.

Dan Boneh, Amit Sahai, and Brent Waters. 2011. Functional encryption: Definitions and challenges. In Theory of Cryptography Conference. Springer, Springer, 253-273.

Kewei Cheng, Tao Fan, Yilun Jin, Yang Liu, Tianjian Chen, and Qiang Yang. 2019. SecureBoost: A Lossless Federated Learning Framework. arXiv preprint arXiv:1901.08755 (2019).

Ronald Cramer, Ivan Bjerre Damgård, and Jesper Buus Nielsen. 2015. Secure multiparty computation. Cambridge University Press.

Ivan Damgard and Mads Jurik. 2001. A generalisation, a simpli. cation and some applications of paillier's probabilistic public-key system. In International Workshop on Public Key Cryptography. Springer, Springer, 119-136.

Ivan Damgard, Marcel Keller, Enrique Larraia, Valerio Pastro, Peter Scholl, and Nigel P Smart. 2013. Practical covertly secure MPC for dishonest majority-or: breaking the SPDZ limits. In European Symposium on Research in Computer Security. Springer, 1-18.

Ivan Damgard, Valerio Pastro, Nigel Smart, and Sarah Zakarias. 2012. Multiparty computation from somewhat homomorphic encryption. In Annual Cryptology Conference. Springer, 643-662.

Mentari Djatmiko, Stephen Hardy, Wilko Henecka, Hamish Ivey-Law, Maximilian Ott, Giorgio Patrini, Guillaume Smith, Brian Thorne, and Dongyao Wu. 2017. Privacy-preserving entity resolution and logistic regression on encrypted data. Private and Secure Machine Learning (PSML) (2017).

Cynthia Dwork and Jing Lei. 2009. Differential privacy and robust statistics .. In STOC, vol. 9. ACM, 371-380.

Cynthia Dwork, Aaron Roth, et al. 2014. The algorithmic foundations of differential privacy. Foundations and TrendsR in Theoretical Computer Science 9, 3-4 (2014), 211-407.

Cynthia Dwork, Guy N Rothblum, and Salil Vadhan. 2010. Boosting and differential privacy. In 2010 IEEE 51st Annual Symposium on Foundations of Computer Science. IEEE, IEEE, 51-60.

Alex Escala, Gottfried Herold, Eike Kiltz, Carla Rafols, and Jorge Villar. 2017. An algebraic framework for Diffie-Hellman assumptions. Journal of Cryptology 30,1 (2017), 242-288.

(56) References Cited

OTHER PUBLICATIONS

Matt Fredrikson, Somesh Jha, and Thomas Ristenpart. 2015. Model inversion attacks that exploit confidence information and basic countermeasures. In Proceedings of the 22nd ACM SIGSAC Conference on Computer and Communications Security. ACM, ACM, 1322-1333.
Shafi Goldwasser, S Dov Gordon, Vipul Goyal, Abhishek Jain, Jonathan Katz, Feng-Hao Liu, Amit Sahai, Elaine Shi, and Hong-Sheng Zhou. 2014. Multi-input functional encryption. In Annual International Conference on the Theory and Applications of Cryptographic Techniques. Springer, Springer, 578-602.
Vipul Goyal, Omkant Pandey, Amit Sahai, and Brent Waters. 2006. Attribute based encryption for fine-grained access control of encrypted data. In Proceedings of the 13th ACM conference on Computer and communications security. Acm,89-98.
Stephen Hardy, Wilko Henecka, Hamish Ivey-Law, Richard Nock, Giorgio Patrini, Guillaume Smith, and Brian Thorne. 2017. Private federated learning on vertically partitioned data via entity resolution and additively homomorphic encryption. arXiv preprint arXiv:1711. 10677 (2017).
Michael I Jordan and Tom M Mitchell. 2015. Machine learning: Trends, perspectives, and prospects. Science 349, 6245 (2015), 255-260.
Peter Kairouz, Sewoong Oh, and Pramod Viswanath. 2014. Extremal mechanisms for local differential privacy. In Advances in neural information processing systems.2879-2887.
Jakub Konecny, H Brendan McMahan, Felix X Yu, Peter Richtárik, Ananda Theertha Suresh, and Dave Bacon. 2016. Federated learning: Strategies for improving communication efficiency. arXiv preprint arXiv:1610.05492 (2016).
Yann LeCun, Yoshua Bengio, and Geoffrey Hinton. 2015. Deep learning. nature 521, 7553 (2015), 436. (Abstract Only).
Yann LeCun, Corinna Cortes, and Burges Christopher J.C. 2010. MNIST handwritten digit database. (2010). http://yann.lecun.com/exdb/mnist/.
H Brendan McMahan, Eider Moore, Daniel Ramage, Seth Hampson, et al. 2016. Communication-efficient learning of deep networks from decentralized data. arXiv preprint arXiv:1602.05629 (2016).
Milad Nasr, Reza Shokri, and Amir Houmansadr. 2018. Machine learning with membership privacy using adversarial regularization. In Proceedings of the 2018 ACM SIGSAC Conference on Computer and Communications Security. ACM, ACM, 634-646.
Milad Nasr, Reza Shokri, and Amir Houmansadr. 2019. Comprehensive Privacy Analysis of Deep Learning: Stand-alone and Federated Learning under Passive and Active White-box Inference Attacks. In 2019 IEEE Symposium on Security and Privacy (SP). IEEE, ACM.
Martin Pettai and Peeter Laud. 2015. Combining differential privacy and secure multiparty computation. In Proceedings of the 31st Annual Computer Security Applications Conference. ACM, ACM, 421-430.
Zhan Qin, Yin Yang, Ting Yu, Issa Khalil, Xiaokui Xiao, and Kui Ren. 2016. Heavy hitter estimation over set-valued data with local differential privacy. In Proceedings of the 2016 ACMSIGSAC Conference on Computer and Communications Security. ACM, 192-203. (Abstract Only).
Daniel Shanks. 1971. Class number, a theory of factorization, and genera. In Proc.of Symp. Math. Soc., 1971, vol. 20. 41-440.
Reza Shokri, Marco Stronati, Congzheng Song, and Vitaly Shmatikov. 2017. Membership inference attacks against machine learning models. In 2017 IEEE Symposium on Security and Privacy (SP). IEEE, 3-18.
Paul Voigt and Axel von dem Bussche. 2017. The EU General Data Protection Regulation (GDPR): A Practical Guide (1st ed.). Springer Publishing Company, Incorporated.

* cited by examiner

PRIVACY-PRESERVING FEDERATED LEARNING

BACKGROUND

The present disclosure relates to machine learning, and more specifically, to enhanced techniques for machine learning with improved privacy guarantees.

Machine learning (ML) has been widely applied in industry and academia to a wide variety of domains. While traditional ML approaches depend on a centrally managed training data set, additional work has recently involved in federated learning (FL), where participants cooperatively train a model using their own individual data. Privacy considerations drive interest in decentralized learning frameworks in which multiple participants collaborate to train a ML model, as they typically do not wish to share their respective training data sets. FL can utilize a decentralized process that can scale to thousands of participants. As the training data does not leave each participant's domain, FL is suitable for use cases that are sensitive to data sharing. This can include health care, financial services and other scenarios of particular privacy sensitivity or subject to regulatory mandates.

In some FL systems, each participant trains a model locally and exchanges the model parameters with others (e.g., a centralized aggregator), while withholding the privacy-sensitive training data. However, this approach still poses privacy risks. For example, inference attacks in the learning phase have been demonstrated by Milad Nasr, Reza Shokri, and Amir Houmansadr. 2019. *Comprehensive Privacy Analysis of Deep Learning: Stand-alone and Federated Learning under Passive and Active White-box Inference Attacks*. In 2019 IEEE Symposium on Security and Privacy (SP). IEEE, ACM. Similarly, deriving private information from a trained model has been demonstrated in Reza Shokri, Marco Stronati, Congzheng Song, and Vitaly Shmatikov. 2017. *Membership inference attacks against machine learning models*. In 2017 IEEE Symposium on Security and Privacy (SP). IEEE, 3-18. Additionally, a model inversion attack has been presented in Matt Fredrikson, Somesh Jha, and Thomas Ristenpart. 2015. *Model inversion attacks that exploit confidence information and basic countermeasures*. In Proceedings of the 22nd ACM SIGSAC Conference on Computer and Communications Security. ACM, ACM, 1322-1333.

Some efforts have been made to provide privacy guarantees, such as described in Cynthia Dwork and Jing Lei. 2009. *Differential privacy and robust statistics*. In STOC, Vol. 9. ACM, 371-380. However, these systems introduce extra communication overhead, which significantly impacts their effectiveness. Additionally, existing systems typically still rely on a trusted aggregator, exposing individual participants to unnecessary risk.

SUMMARY

According to one embodiment of the present disclosure, a method is provided. The method includes facilitating distribution of a plurality of public encryption keys to a plurality of participants in a federated learning system. The method further includes receiving a first plurality of responses from the plurality of participants, wherein each respective response of the first plurality of responses was generated based on training data local to a respective participant of the plurality of participants and is encrypted using a respective public encryption key of the plurality of public encryption keys. Additionally, the method includes generating a first aggregation vector based on the first plurality of responses, and retrieving a first private encryption key using the first aggregation vector. The method then includes generating an aggregated model based on the first private encryption key and the first plurality of responses. Advantageously, this enables the aggregate model to be generated efficiently with minimal communication overhead between the aggregator and the participants, while maintaining high security for the individual participants.

According to another embodiment of the present disclosure, the method further comprises determining that a first participant of the plurality of participants has ceased participation in the federated learning system, receiving a second plurality of responses from one or more of the plurality of participants, wherein each respective response of the second plurality of responses is encrypted using a respective public encryption key of the plurality of public encryption keys, generating a second aggregation vector based on the second plurality of responses, wherein the second aggregation vector excludes the first participant, retrieving a second private encryption key using the second aggregation vector, and refining the aggregated model based on the second private encryption key and the second plurality of responses. Advantageously, this enables the system to continue the learning process using new aggregation parameters, even when one or more participants cease participation. Such an embodiment does not require rekeying or otherwise restarting the process, which significantly improves scalability, flexibility, and efficiency.

According to yet another embodiment of the present disclosure, the method further comprises determining that a new participant is beginning participation in the federated learning system, wherein the plurality of public encryption keys includes a first public encryption key that is not in use by any of the plurality of participants, and facilitating distribution of the first public encryption key to the new participant. Advantageously, this enables the system to continue the learning process using new aggregation parameters, to include one or more new participants, even when new participants join after the initial setup. Such an embodiment does not require rekeying or otherwise restarting the process, which significantly improves scalability, flexibility, and efficiency.

According to still another embodiment of the present disclosure, the first aggregation vector defines a respective weighting for each of the plurality of participants. This enables the aggregator to dynamically weight each participant according to any number of factors. This also enables the aggregator to adapt to new participants and to account for prior participants, by modifying the weights assigned to each in the vector.

According to another embodiment of the present disclosure, retrieving the first private encryption key using the first aggregation vector comprises transmitting the first aggregation vector to a key component, wherein the key component is configured to determine a number of non-zero entries in the first aggregation vector, confirm that the number of non-zero entries in the first aggregation vector exceeds a predefined threshold, and generate the first private encryption key based on the first aggregation vector. Advantageously, this enables the system to operate securely by ensuring that the individual parameters of any one participant cannot be identified.

According to still another embodiment of the present disclosure, retrieving the first private encryption key using the first aggregation vector comprises transmitting the first aggregation vector to a key component, wherein the key component is configured to determine a number of entries in the first aggregation vector, confirm that the number of entries in the first aggregation vector exceeds a predefined threshold, and generate the first private encryption key based on the first aggregation vector. Advantageously, this enables the system to operate securely by ensuring that the individual parameters of any one participant cannot be identified.

According to a further embodiment of the present disclosure, generating the first private encryption key further comprises confirming that each non-zero entry in the first aggregation vector is equal to one divided by the number of non-zero entries in the first aggregation vector. Advantageously, this further improves security of the system by ensuring that the individual models of each participant are further obfuscated and protected from inference.

According to yet another embodiment of the present disclosure, the first private encryption key can be used to determine one or more aggregate values based on the first plurality of responses, wherein an individual value of each of the first plurality of responses remains encrypted. Advantageously, this ensures that private data is kept secure, because the model data of any given participant remains protected. Only the aggregate values for a number of participants can be determined.

According to an additional embodiment of the present disclosure, each respective participant of the plurality of participants adds noise to its response prior to encrypting it using the corresponding respective encryption key. Such an embodiment allows the participants to further protect their training data by applying noise.

According to another embodiment of the present disclosure, the method additionally includes determining that a first participant of the plurality of participants has ceased participation in the federated learning system, and generating the first aggregation vector to exclude the first participant. Advantageously, this enables the system to continue the learning process using dynamic aggregation parameters, even when one or more participants cease participation, and even in the first round of training. Such an embodiment does not require rekeying or otherwise restarting the process, which significantly improves scalability, flexibility, and efficiency.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Figure 1:
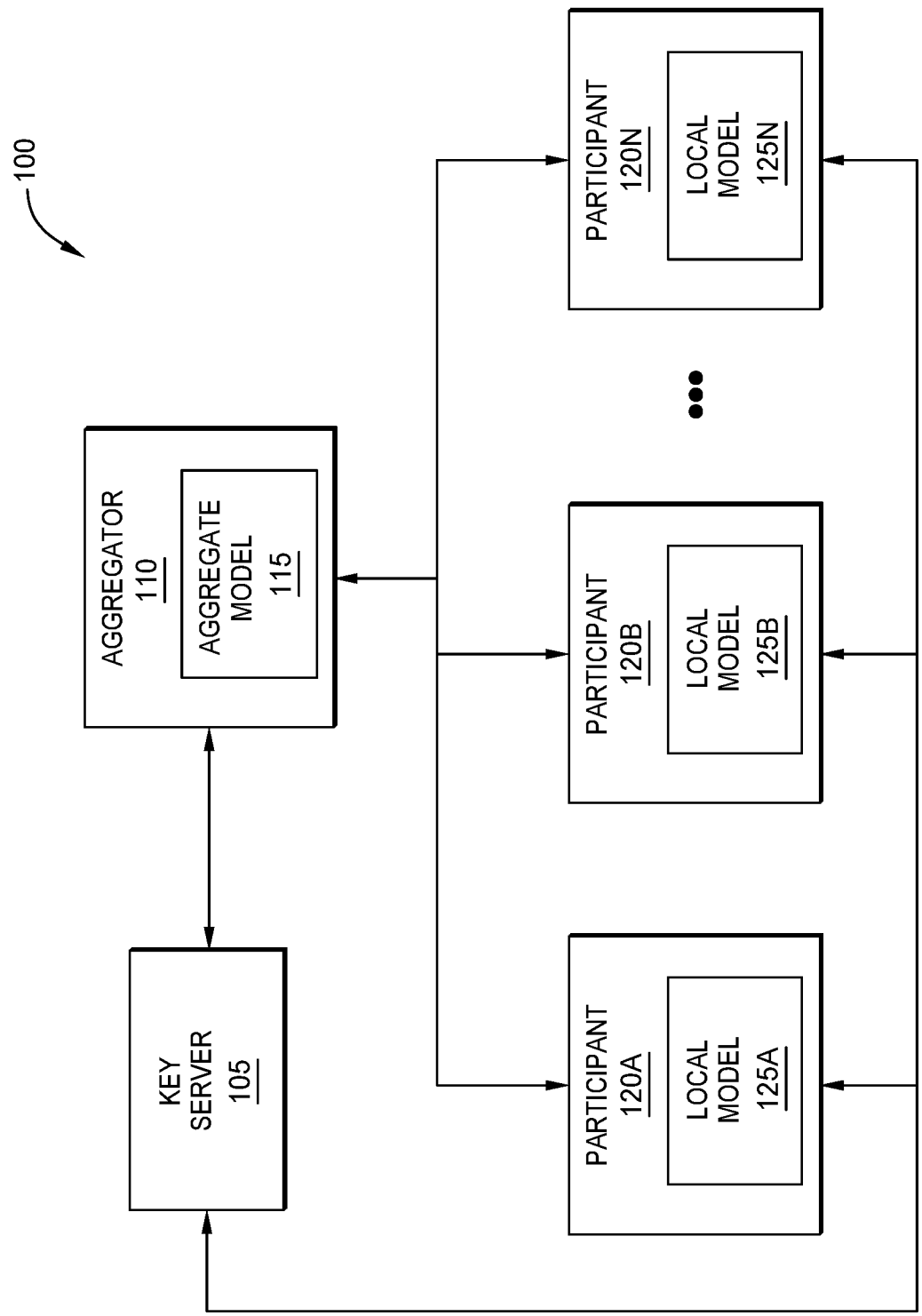
FIG. 1 illustrates a system configured to improve efficiency in federated learning environments while maintaining individual privacy, according to one embodiment disclosed herein.

Federated learning has emerged as a promising approach for collaborative and privacy-preserving learning. Participants in a federated learning process cooperatively train a model by exchanging model parameters instead of the actual training data, which they might want to keep private. However, parameter interaction and the resulting model still might disclose information about the training data used. To address these privacy concerns, several approaches have been proposed. However, these typically result in large communication overhead and slow training time. Embodiments of the present disclosure provide an approach for privacy-preserving federated learning employing a secure multiparty computation (SMC) protocol based on functional encryption. The disclosed system is effective, efficient, and resilient to participants dropping out. Experimentation against existing solutions shows that embodiments of the present disclosure can reduce training time by 68% and data transfer volume by 92% on average, while providing the same model performance and the same or improved privacy guarantees.

In one embodiment, functional encryption (FE) is applied to provide privacy. FE is a public-key cryptosystem that allows parties to encrypt their data. In embodiments, an external entity can compute a specific function on the ciphertext without learning anything additional from the underlying plaintext data. For this purpose, a trusted third party (TPA) is used to set up a master private key and a master public key that will be used to derive multiple public keys to one or more parties who intend to encrypt their data. In an embodiment, given a function $f(\cdot)$, a functional private key $sk_f$ can be generated by the TPA who holds a master secret key. By processing the private function-related key $sk_f$, a decryptor can compute $f_{sk_f}(x)$ from the encrypted data (enc(x)), without revealing the plaintext x.

In at least one embodiment, to satisfy the distributed setting, a variant of functional encryption, Multi-Input Functional Encryption (MIFE), is used-in. In MIFE, a functional secret key $sk_f$ can correspond to an n-ary function $f(\cdot)$ that takes multiple ciphertexts as input. For example, given a set of encrypted parameters from individual participants and the functional secret key $sk_f$ corresponding to an aggregation vector, an aggregator can compute the average value for the parameters (e.g., corresponding to the inner product of the aggregation vector and the encrypted parameters from individual participants), without learning the actual value provided by any one participant.

In embodiments, a separate public key is distributed to each participant in the federated learning system. The participants can then encrypt their parameter values using their unique key, and transmit the encrypted data to an aggregator. In an embodiment, the aggregator must request a decryption key from a trusted party. To do so, the aggregator transmits an aggregation vector indicating the desired aggregation function of the decryption. For example, in one embodiment, the aggregation vector specifies a set of weights for the set of participants (e.g., a value from zero to one for each participant) indicating how to weight the contribution of each participant when aggregating (e.g., averaging) the parameters. In at least one embodiment, the trusted party can then evaluate the aggregation vector to confirm it satisfies predefined security criteria, prior to returning the needed key. This key then enables the aggregator to decrypt the received data to generate aggregated parameter values for an aggregate model.

Advantageously, this enables the aggregator to generate aggregate models, while disallowing access to the actual parameter values from any given participant. Further, because the trusted component(s) verify the aggregation vector to prevent inferences or breaches, the aggregator itself need not be trusted. Further, embodiments disclosed herein reduce communication overhead by avoiding repeated transmissions between the participants and the aggregator. Instead, a single request for data (to each participant), followed by a single response from each participant including encrypted parameters, is utilized.

FIG. 1 illustrates a system 100 configured to improve efficiency in federated learning environments while maintaining individual privacy, according to one embodiment disclosed herein. In the illustrated embodiment, a Key Server 105, Aggregator 110, and plurality of Participants 120A-N are communicatively coupled. Although depicted as discrete components for conceptual clarity, in some embodiments, the components may be combined or divided across any number of entities. For example, in one embodiment, the Key Server 105 operates as part of the Aggregator 110. In an embodiment, the Key Server 105 handles the provisioning and distribution of keys, as well as the validation of the aggregation vector. The Aggregator 110 polls the Participants 120 for updated parameter data, and generates an Aggregate Model 115 by aggregating this data. Additionally, as illustrated, each Participant 120A-N maintains a respective Local Model 125A-N, which is trained using (private) local training data.

In the illustrated embodiment, the process begins when the Key Server 105 provisions encryption keys. In one embodiment, the Aggregator 110 requests that the Key Server 105 begin such a process. The Key Server 105 can first generate a master public key and a master private key. In one embodiment, using the master public key, the Key Server 105 generates a set of public keys such that each individual Participant 120A-N is assigned a unique public key. In one embodiment, to allow new participants to join the training process midstream, the Key Server 105 provisions a larger number of keys than the initial set of participants. In this way, when a new participant wishes to join, they can acquire one of these reserved keys for participating. Advantageously, this enables new participants to join without requiring any changes for other participants. For example, some existing systems require that the training process be restarted, and/or that the keying process begin again, each time a participant wishes to join or drop out of the training.

By generating an excess of unique public keys at the outset, embodiments of the present disclosure enable participants to join without requiring these efforts. Further, as discussed in more detail below, the aggregation vector flexibility (in that it can be defined dynamically based on the responses, rather than at the outset) enables participants to cease participation (e.g., to drop out of the training) without requiring the model to be re-trained, or requiring the system to re-key.

Once the keys are distributed, in one embodiment, the Aggregator 110 initiates the learning process by (synchronously or asynchronously) querying each Participant 120A-N to train a specified learning algorithm/model and return a response. For example, in one embodiment, the Aggregator 110 asks each Participant 120A-N to train a neural network with defined hyperparameters, using all or a subset of its local data. Each Participant 120A-N then trains a Local Model 125A-N using local training data. In such an embodiment, the response can include the internal weights of the Local Model 125. In embodiments, the content of the response depends in part on the type of model being used. The responses generally include parameters that can be used to instantiate or generate a trained model. For example, in the case of a neural network, the model parameters may include weights while in the case of a decision tree it may include single numbers.

In an embodiment, prior to returning the parameters, each Participant 120A-N encrypts the data using its individual unique public key. Additionally, in at least one embodiment, each Participant 120A-N can add differential privacy noise to its model parameters in order to further obfuscate the original training data. The Participant 120 can then encrypt this noisy data.

Once a sufficient number of responses have been received, the Aggregator 110 generates an aggregation vector. In one embodiment, the Aggregator 110 waits for all queried participants to respond. In another, the Aggregator 110 waits a predefined period of time. In still another embodiment, the Aggregator 110 waits until a predefined number or percentage of Participants 120 have responded. In an embodiment, the aggregation vector will be used to compute the inner product. That is, the Aggregator 110 requests a private key $sk_{f,w_p}$ based on the aggregation vector $w_p$. This private key can be used to compute the aggregate value of the encrypted parameters. For example, to determine an average value based on equal weight for each participant's model, $w_p$ can be set as $$w_p = \left(\frac{1}{n}, \frac{1}{n}, \ldots, \frac{1}{n}\right)$$

such that $|w_p|=n$, where n is the number of responses received.

In some embodiments, the weights for each respondent can be adjusted to provide more or less weight for a given Participant 120. For example, a Participant 120 that has a large amount of training data may be afforded a relatively higher weight, as compared to a Participant 120 with less training data. Similarly, a Participant 120 with relatively higher-quality training data may be afforded additional weight. In an embodiment, the Key Server 105 generates a private key based on the aggregated vector. This private key can then be used by the Aggregator 110 to compute aggregate values for the parameters. These aggregate parameters are then used to create the Aggregate Model 115. In at least one embodiment, the Aggregator 110 can then transmit the Aggregate Model 115 (or the aggregate parameters) to the Participant(s) 120. In this way, each Participant 120 can help collaboratively train an Aggregate Model 115, without risking data privacy. Because it is trained on additional data (and potentially more diverse data), the Aggregate Model 115 is likely to be higher-quality than any of the Local Models 125.

In an embodiment, this training process can be iterated any number of times to refine the Aggregate Model 115. That is, the Aggregator 110 can transmit additional queries for the next round of training, and proceed as discussed above. In at least one embodiment, prior to returning the private key, the Key Server 105 validates the aggregation vector. For example, in one such embodiment, the Key Server 105 confirms that the aggregation vector includes a minimum quorum of respondents. That is, the Key Server 105 can determine the number of non-zero weights in the vector, and compare this to a minimum threshold. This can prevent the Aggregator 110 (or other colluding parties) from identifying the parameters of a single Participant 120. For example, using an aggregation vector with a value of "1" for a given Participant 120 and "0" for all other Participants 120A-N, the Aggregator 110 could determine the parameters of the single targeted participant.

In some embodiments, the Key Server 105 further evaluates each non-zero weight to confirm it satisfies predefined criteria. For example, if the aggregation vector includes a relatively low weight for all but the target Participant 120, the Aggregator 110 may be able to infer or approximate the parameters for the target participant. In some embodiments, the Key Server 105 prevents such an attack by utilizing a predefined minimum value for each non-zero weight in the vector. In one such embodiment, the Key Server 105 confirms that the weight of each Participant 120 is equal to one divided by the number of participants. That is, the Key Server 105 can confirm that each Participant 120 is provided with equal weight.

In at least one embodiment the inner-product functionality used to aggregate the parameters is defined using Equation 1 below, wherein n denotes the total number of input sources, $\eta_i$ is the length of each input vector $x_i$, and dimension$(y)=\Sigma_{i=1}^{n}$ dimension$(x_i)$.

$$f((x_1, x_2, \ldots, x_n), y) = \sum_{i=1}^{n}\sum_{j=1}^{\eta_i}\left(x_{ij}y_{\Sigma_{k=1}^{i-1}\eta_k+j}\right) \quad \text{Equation 1}$$

$$\text{such that } |y| = \sum_{i=1}^{n}\eta_i$$

In one embodiment, given the above inner-product equation, the system 100 constructs the MIFE model using a series of algorithms to function: a "setup" algorithm to generate the initial master keys (performed by the Key Server 105), a "distribute" algorithm to distribute keys to each participant (also performed by the Key Server 105), a "generate" algorithm to generate a secret key given an aggregation vector (performed by the Key Server 105), an "encrypt" algorithm to encrypt the local parameters before transmitting (performed by each Participant 120), and a "decrypt" algorithm to decrypt aggregate parameters from the encrypted local parameters and the secret key (performed by the Aggregator 110).

In at least one embodiment, the setup procedure is defined as Setup($1^\lambda$, $\vec{\mathcal{F}_n}$) where the Key Server 105 first generates secure parameters as $\mathcal{G}:=(\mathbb{G}, p, g)\leftarrow$GroupGen($1^\lambda$), and then generates several samples as $a<_R\mathbb{Z}_p$, $a:=(1, a)^T$, $\forall_i\in\{1, \ldots, n\}$: $W_i\leftarrow_R\mathbb{Z}_p^{n_i\times 2}$, $u_i\leftarrow_R\mathbb{Z}_p^{n_i}$. The Key Server 105 can then generate the master public key and master private key as mpk:=($\mathcal{G}$, $g^a$, $g^{Wa}$), msk:=($W,(u_i)_{i\in\{1,\ldots,n\}}$).

Further, in one embodiment, the distribute method is defined as PKDistribute(mpk, msk, $id_i$), where the Key Server 105 looks up the existing keys via $id_i$ and returns public key as $pk_i:=(\mathcal{G}, g^a, (Wa)_i, u_i)$.

Additionally, in an embodiment, the generate technique is defined as SKGenerate(mpk, msk, y), where the Key Server 105 first partitions y into $(y_1\|y_2\|\ldots\|y_n)$, where $|y_i|$ is equal to $\eta_i$. The Key Server 105 can then generate the function derived key (the secret key for the aggregation vector) as $sk_{f,y}:=((d_i^T)\leftarrow(y_i^T W_i), z\leftarrow\Sigma(y_i^T u_i))$.

Moreover, in one embodiment, the encryption algorithm is defined as Encrypt($pk_i$, $x_i$), where the Participant 120 first generates a random nonce $r_i\leftarrow_R\mathbb{Z}_p$, and then computes the ciphertext as $ct_i:=(t_i\leftarrow g^{ar_i}, c_i\leftarrow g^{(x_i+u_i+Wa_ir_i)})$.

Furthermore, in an embodiment, the decryption method is defined as Decrypt(ct, $sk_f$, y), where the Aggregator 110 first calculates as follows:

$$C := \frac{\Pi_{i\in[n]}\left(\left(g^{y_i^T c_i}\right)/\left(g^{d_i^T t_i}\right)\right)}{z}.$$

The Aggregator 110 can then recover the functional result as $f((x_i, x_2, \ldots, x_n), y)=\log_g(C)$.

In at least one embodiment, the Aggregator 110 holds the vector y, and each $\eta_i$ is set as 1, indicating the input from each Participant 110 is a single element, rather than a vector (as described in some other MIFE schemes). Using the above-defined functionality, in one embodiment, the system 100 implements secure federated learning using Algorithm 1, below.

---

Algorithm 1

---

Input: $\mathcal{L}_{FL}$ := the ML algorithm(s) to be trained; $\epsilon$ := the privary guarantee(s), such as the differential privacy parameter(s); $\mathcal{S}_\mathcal{P}$ := the set of participants, where $\mathcal{P}_i \in \mathcal{S}_\mathcal{P}$ holds its own dataset $\mathcal{D}_i$; N := the maximum number of expected participants; t := the minimum number of aggregated replies.
Output: a trained global model $\mathcal{M}$.

1 function TPA-initialization($1^\lambda$, N, $\mathcal{S}_\mathcal{P}$)
2   mpk, msk ← MIFE.Setup($1^\lambda, \mathcal{F}_N^1$) s.t. N >> $|\mathcal{S}_\mathcal{P}|$;
3   foreach $\mathcal{P}_i \in \mathcal{S}_\mathcal{P}$ do
4    $pk_i$ ← MIFE. PKDistribute(mpk, msk, $\mathcal{P}_i$);
5   end
6 function aggregate($\mathcal{L}_{FL}, \mathcal{S}_\mathcal{P}$, t)
7   foreach $\mathcal{P}_i \in \mathcal{S}_\mathcal{P}$ do
8    asynchronously query $\mathcal{P}_i$ with $msg_{q,i} = (\mathcal{L}_{FL}, |\mathcal{S}_\mathcal{P}|)$;
9   end
10   do
11    $\mathcal{S}_{msg_{recv}}$ ← collect participant response $msg_{r,i}$;
12   while $|\mathcal{S}_{msg_{recv}}| \geq$ t and still in max waiting time;
13   if $|\mathcal{S}_{msg_{recv}}| \geq$ t then
14    specify $w_p$ vector; request the $sk_{f,w_p}$ from TPA;
15    $\mathcal{M}$ ← MIFE. Decrypt($sk_{f,w_p}$, $w_p$, $\mathcal{S}_{msg_{recv}}$);
16   end
17   return $\mathcal{M}$
18 function participant-train($\epsilon$, t, $msg_{q,i}$, $\mathcal{D}_i$, $pk_i$)

-continued

Algorithm 1

```
19  M_i ← L_FL(D_i);
20  M_i^DP ← DP(ε, M_i, t);
21  msg_{r,i} ← MIFE. Encrypt(M_i^DP, pk_i),
22  send msg_{r,i} to aggregator;
```

In the embodiment described by Algorithm 1, the Key Server 105 performs the Setup and PKDistribute algorithms presented above, such that each participant $P_i$ has its own public key $pk_i$ (lines 1-5). Note that in the described embodiment, the system allows new participants to join the training process even if it has already started. To achieve this, the Key Server 105 provisions a larger number of keys than the initial set of participants (line 2). In this way, when new participants join the training process, they need to acquire the individual public key from the TPA, and then participate in the learning protocol. This does not require any changes for other participants.

To begin the learning process described in Algorithm 1, the Aggregator 110 asynchronously queries each participant $P_i$ with a query to train the specified learning algorithm $L_{FL}$ and the number of participant. Then, the aggregator collects the responses of each party $P_i$ (lines 7-12).

When responses are received, assuming there is quorum, the Aggregator 110 requests a key from the Key Server 105 corresponding to the weighted vector $w_p$ that will be used to compute the inner product. That is, the Aggregator 110 requests private key $sk_{f,w_p}$ from the Key Server 105 based on $w_p$. For computation of the average cumulative sum of each participant's model, $w_p$ can be set as $$w_p = \left(\frac{1}{n}, \frac{1}{n}, \ldots, \frac{1}{n}\right)$$

such that $|w_p|=n$, where n is the number of responses received.

Then, in one of the discussed embodiments, the Aggregator 110 updates the global model M by applying the decryption algorithm of the MIFE cryptosystem on the collected ciphertext set $S_{msg_{recv}}$ and $sk_{f,w_p}$. Note that in one embodiment, the system assumes that the Aggregator 110 will get a response from every participant. In the case of dropouts, n can be changed so that it reflects the number of participants that replied and are being aggregated.

At the participant side of the above algorithm, when a query for training is received by participant $P_i$, it trains a local model $M_i$ using its dataset $D_i$. During the training process, in some embodiments, the participant adds differential privacy noise to the model parameters. $P_i$ then encrypts the resulting noisy model using the MIFE encryption algorithm and sends it to the Aggregator 110 (lines 18-22).

Figure 2:
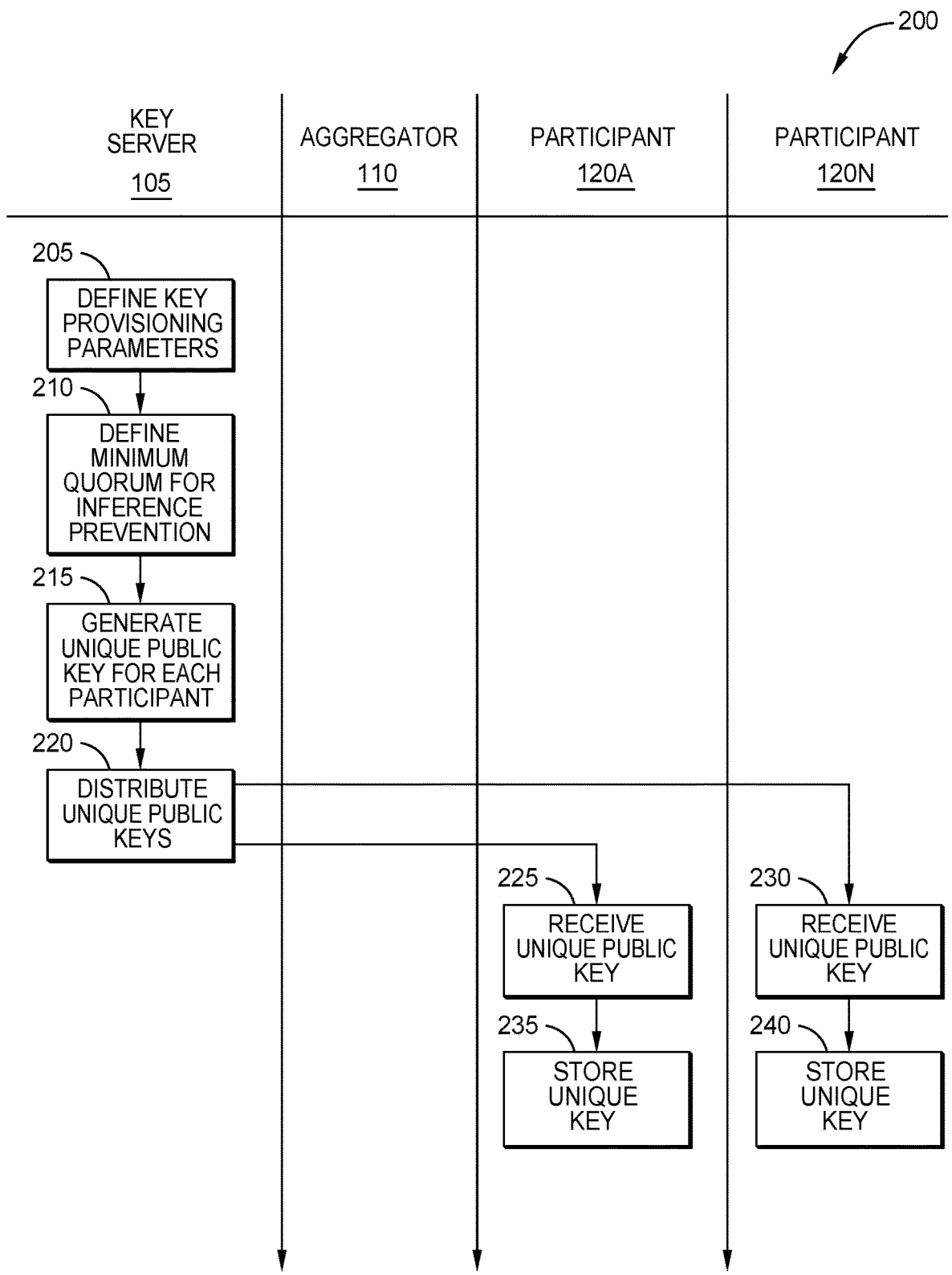
FIG. 2 depicts a workflow for encryption key provisioning in a federated learning environment, according to one embodiment disclosed herein.

FIG. 2 depicts a workflow 200 for encryption key provisioning in a federated learning environment, according to one embodiment disclosed herein. The workflow 200 begins at block 205, when the Key Server 105 defines or determines the key provisioning parameters for the federated learning environment. In at least one embodiment, these parameters are provided by one or more users or Participants 120. In one embodiment, these parameters allow for potential new participants to join the learning process after it has begun. For example, in one embodiment, the Key Server 105 generates a master public key and master private key based at least in part on the expected number of participants, the number of extra keys desired, and the like.

The workflow 200 then continues to block 210, where the Key Server 105 defines or determines the minimum quorum desired for inference prevention. In one embodiment, this is similarly specified by the Aggregator 110, and/or by one or more Participants 120. In an embodiment, the quorum specifies the minimum number of Participants 120 which must be included in the aggregation vector. For example, the configuration may specify that the Key Server 105 should only generate a decryption key if the provided aggregation vector includes at least ten participants (or any other number). In some embodiments, the quorum is specified as a percentage of the initial participants. For example, the quorum may specify that the number of participants included in the aggregation vector must be at least half of the number of initial participants. In one embodiment, the number of participants included in the aggregation vector is a percentage of the maximum number of retrieved public keys. In one embodiment, the number of participants included by the vector corresponds to the number of non-zero weights. In some embodiments, the Key Server 105 utilizes a predefined minimum weight to determine whether a participant is considered "included."

At block 215, the Key Server 105 generates a set of public encryption keys, based on a master public and/or private key. In one embodiment, the Key Server 105 generates a unique and individual key for each participant in the federated learning system. In at least one embodiment, the Key Server 105 generates additional keys to be reserved for future participants that wish to join. The workflow 200 then continues to block 220, where the Key Server 105 distributes the unique public keys to the indicated participants, such that each participant receives its own key.

As illustrated, at blocks 225 and 230, each Participant 120A-N receives its assigned unique key. Similarly, at blocks 235 and 240, each Participant 120A-N stores its received key. In this way, each Participant 120A-N can encrypt its model data using a unique key, rather than a shared encryption key. This improves scalability and flexibility, because it allows existing Participants 120 to drop out and new Participants 120 to join, without requiring rekeying or restarting the training process.

Figure 3:
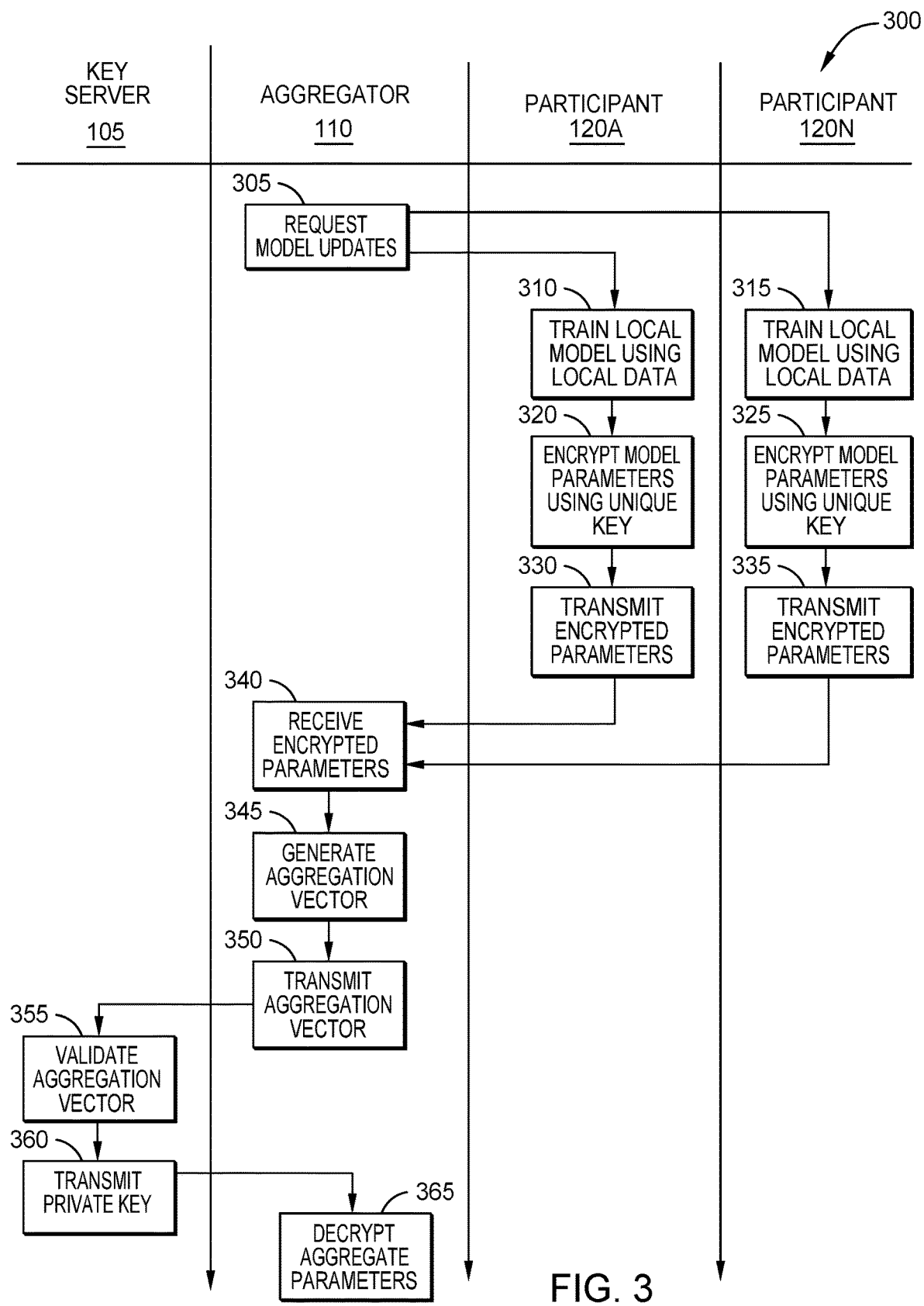
FIG. 3 depicts a workflow for efficient and secure federated learning, according to one embodiment disclosed herein.

FIG. 3 depicts a workflow 300 for efficient and secure federated learning, according to one embodiment disclosed herein. The workflow 300 begins after the initial setup is completed (e.g., after public keys have been distributed to each Participant 120A-N). At block 305, the Aggregator 110 requests model updates from each Participant 120A-N. In embodiments, the requested content can vary based on the model being trained. For example, for neural networks, the Aggregator 110 can transmit a request for the internal weights of each local model, after a round of training. In some embodiments, the request includes additional detail, such as the type of model, hyperparameters, learning algorithms to use, gradient, step size, and the like.

In at least one embodiment, these requests are transmitted asynchronously, such that the Aggregator 110 need not wait for any particular Participant 120 to respond prior to proceeding. In some embodiments, the Aggregator 110 includes a timeout in the request, indicating that the federated learning system will proceed without data from any Participants 120A-N that have not responded within the time allotted. At blocks 310 and 315, each Participant 120A-N responds to the request by training or refining their respective local models using their respective local training data.

After the requested round of training is complete, at block 320 and 325, each respective Participant 120A-N extracts the relevant and/or requested model parameters from their local model, and encrypts them using their unique public key (e.g., assigned by the Key Server 105). In at least one embodiment, each Participant 120A-N can first add some level of noise to the model parameters, to further obfuscate their training data. In one such embodiment, the amount of noise added by each Participant 120A-N is determined based in part on the expected number of participants (e.g., the predefined minimum quorum, discussed above). For example, for a given target amount of differential private noise, each Participant 120A-N can apply 1/n of that noise, where n is the predefined minimum quorum, and/or the expected number of Participants 120.

At blocks 330 and 335, after the local training is completed for a given Participant 120A-N, the Participant 120A-N transmits its encrypted (and potentially noisy) model parameters back to the Aggregator 110. At block 340, the Aggregator 110 receives and stores the encrypted parameters from each Participant 120A-N. In one embodiment, the Aggregator 110 waits until all Participants 120A-N have responded prior to proceeding. In another embodiment, the Aggregator 110 waits a predefined period of time. In still another embodiment, the Aggregator 110 waits until a predefined number or percentage of Participants 120A-N have responded. At block 345, once the responses are sufficient, the Aggregator 110 generates an aggregation vector.

As discussed above, the aggregation vector generally includes a set of values, where each value corresponds to a particular Participant 120A-N. Additionally, each value can be a weight (e.g., from zero to one) indicating how heavily to weigh the parameters provided by a particular Participant 120A-N when generating the overall aggregate parameters. For example, the aggregation vector may indicate to give each Participant 120A-N equal weight (e.g., with an equal value for each participant), or to weight some Participants 120A-N more highly than others. In one embodiment, for each Participant 120A-N that did not return model parameters, the Aggregator 110 assigns a zero to the corresponding value in the aggregation vector. In another embodiment, the Aggregator 110 creates the aggregation vector of size correspondent to the number of participants that returned model parameters and sets each of the vector's values to be non-zero weights. The Aggregator 110 then transmits the aggregation vector to the Key Server 105 at block 350.

At block 355, the Key Server 105 validates the aggregation vector. In one embodiment, this validation includes confirming that the number of non-zero values (e.g., the number of participants to be included in the aggregate model update) satisfies the predefined minimum quorum. Additionally, in some embodiments, the Key Server 105 verifies that the weight of each included participant is equal (such that the final aggregate model will be an equal aggregation). In another embodiment, the Key Server 105 confirms that the weights aren't set such that a single participant has excessive impact on the final result (e.g., by setting all but one of the values close to zero, and assigning the target participant a high weight). In yet another embodiment, the Key Server 105 verifies that the size of the aggregation vector is greater than a predefined threshold or minimum quorum.

If the validation is successful, at block 360, the Key Server 105 generates and transmits a corresponding private key to the Aggregator 110. At block 365, the workflow 300 ends when the Aggregator 110 uses the received private key to decrypt an aggregate data model (e.g., aggregate parameters for the model) based on the set of received responses.

This aggregate model can then be distributed to the Participants 120, made available to the public, and the like. In this way, the system can improve a wide variety of technologies through providing improved training and security for a wide variety of ML models. This system can therefore facilitate improved operability of any number of systems that rely on ML.

Figure 4:
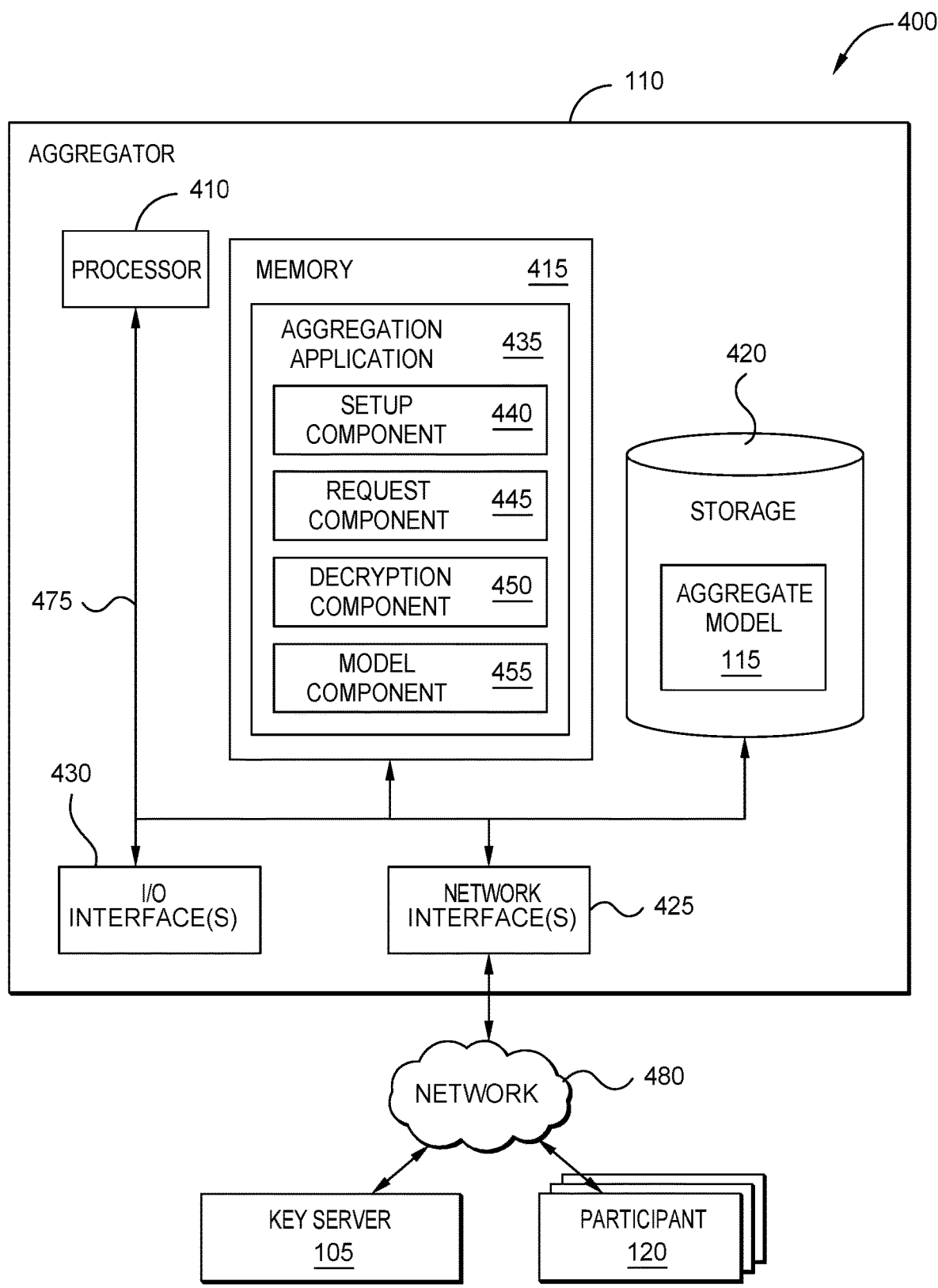
FIG. 4 is a block diagram illustrating an aggregator configured to provide secure and efficient federated learning, according to one embodiment disclosed herein.

FIG. 4 is a block diagram illustrating an Aggregator 110 configured to provide secure and efficient federated learning, according to one embodiment disclosed herein. Although depicted as a physical device, in embodiments, the Aggregator 110 may be implemented using virtual device(s), and/or across a number of devices (e.g., in a cloud environment). As illustrated, the Aggregator 110 includes a Processor 410, Memory 415, Storage 420, a Network Interface 425, and one or more I/O Interfaces 430. In the illustrated embodiment, the Processor 410 retrieves and executes programming instructions stored in Memory 415, as well as stores and retrieves application data residing in Storage 420. The Processor 410 is generally representative of a single CPU and/or GPU, multiple CPUs and/or GPUs, a single CPU and/or GPU having multiple processing cores, and the like. The Memory 415 is generally included to be representative of a random access memory. Storage 420 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 430. Further, via the Network Interface 425, the Aggregator 110 can be communicatively coupled with one or more other devices and components (e.g., via the Network 480, which may include the Internet, local network(s), and the like). As illustrated, the Processor 410, Memory 415, Storage 420, Network Interface(s) 425, and I/O Interface(s) 430 are communicatively coupled by one or more Buses 475. Further, the Aggregator 110 is communicatively coupled with a Key Server 105, and one or more Participants 120.

In the illustrated embodiment, the Storage 420 includes an Aggregate Model 115. As discussed above, the Aggregate Model 115 is generated by aggregating model parameters provided by a number of Participants 120. In this way, the Aggregate Model 115 is collectively trained on a relatively larger dataset than any one Participant 120 could otherwise provide. This improves the accuracy and reliability of the Aggregate Model 115. Additionally, as discussed above, the Aggregate Model 115 can be trained in a way that is communication-efficient, while maintaining high levels of security and privacy for the underlying training data. This allows the Aggregate Model 115 to be freely distributed.

As illustrated, the Memory 415 includes an Aggregation Application 435. Although depicted as software residing in Memory 415, in embodiments, the functionality of the Aggregation Application 435 can be implemented using hardware, software, or a combination of hardware and software. The Aggregation Application 435 includes a Setup Component 440, a Request Component 445, a Decryption Component 450, and a Model Component 455. Although depicted as discrete components for conceptual clarity, in embodiments, the operations of the Setup Component 440, Request Component 445, Decryption Component 450, and Model Component 455 can be combined or distributed across any number of components.

In an embodiment, the Setup Component 440 begins the federated learning process by identifying the learning algorithm(s) to use, the type of ML model, aspects of the input data, the desired result, the set of potential participants, and the like. In some embodiments, one or more of these parameters are selected by a user initializing the environment. In one embodiment, the Setup Component 440 interacts with each Participant 120 to confirm that they wish to participate in the federated learning. The Setup Component 440 can then transmit an indication of the set of participants to the Key Server 105, requesting that the needed keys be created and distributed.

Once the keys have been distributed to each Participant 120, the Request Component 445 generates and transmits requests to the Participants 120, asking each to train or refine its local model using its local training data. In one embodiment, the request can specify any hyperparameters relevant to the round of training. The Request Component 445 can similar collect responses and evaluate the set of responses to determine whether the process should continue (e.g., because sufficient responses have been received) or wait for additional responses.

When sufficient responses have been received, in one embodiment, the Decryption Component 450 generates an aggregation vector specifying a weight for each response that is to be included in the final model. The Decryption Component 450 can then transmit this vector to the Key Server 105, which validates it. If the vector is not successfully validated, in one embodiment, the Decryption Component 450 can attempt to generate a new vector that satisfies the requirements (e.g., the minimum number of participants, the minimum weight of each participant relative to other participants, and the like). If the vector is validated, the Decryption Component 450 receives the corresponding private key and uses it to decrypt the set of responses to extract aggregated model parameters.

In the illustrated embodiment, the Model Component 455 can then use these parameters to instantiate and/or refine the Aggregate Model 115. The Aggregate Model 115 can then be distributed as desired. For example, the Model Component 455 can transmit the aggregated parameters (or other data needed to instantiate the Aggregate Model 115) to each Participant 120 that provided its local parameters. This can incentivize Participants 120 to participate in a round of training, in order to receive the updated Aggregate Model 115.

Figure 5:
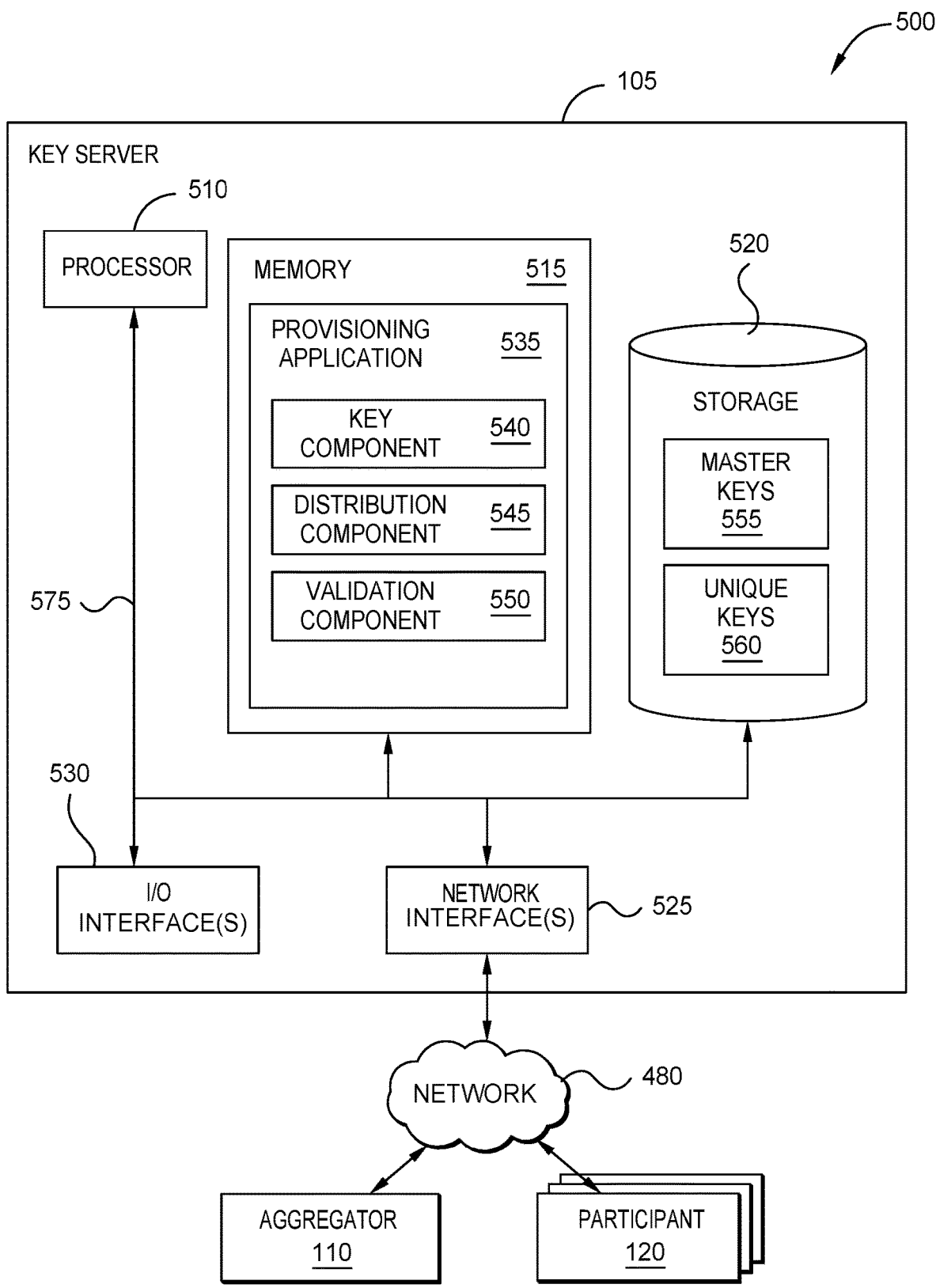
FIG. 5 is a block diagram illustrating a key server configured to facilitate secure and efficient federated learning, according to one embodiment disclosed herein.

FIG. 5 is a block diagram illustrating a Key Server 105 configured to facilitate secure and efficient federated learning, according to one embodiment disclosed herein. Although depicted as a physical device, in embodiments, the Key Server 105 may be implemented using virtual device(s), and/or across a number of devices (e.g., in a cloud environment). As illustrated, the Key Server 105 includes a Processor 510, Memory 515, Storage 520, a Network Interface 525, and one or more I/O Interfaces 530. In the illustrated embodiment, the Processor 510 retrieves and executes programming instructions stored in Memory 515, as well as stores and retrieves application data residing in Storage 520. The Processor 510 is generally representative of a single CPU and/or GPU, multiple CPUs and/or GPUs, a single CPU and/or GPU having multiple processing cores, and the like. The Memory 515 is generally included to be representative of a random access memory. Storage 520 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 530. Further, via the Network Interface 525, the Key Server 105 can be communicatively coupled with one or more other devices and components (e.g., via the Network 480). As illustrated, the Processor 510, Memory 515, Storage 520, Network Interface(s) 525, and I/O Interface(s) 530 are communicatively coupled by one or more Buses 575. As illustrated, the Key Server 105 is communicatively coupled with the Aggregator 110, and one or more Participants 120.

In the illustrated embodiment, the Storage 520 includes one or more Master Keys 555 (e.g., a public master key and a private master key), as well as one or more Unique Keys 560. In an embodiment, the Unique Keys 560 are generated for the set of Participants 120, based on the Master Keys 555. As illustrated, the Memory 515 includes a Provisioning Application 535. Although depicted as software residing in Memory 515, in embodiments, the functionality of the Provisioning Application 535 can be implemented using hardware, software, or a combination of hardware and software. The Provisioning Application 535 includes a Key Component 540, a Distribution Component 545, and a Validation Component 550. Although depicted as discrete components for conceptual clarity, in embodiments, the operations of the Key Component 540, Distribution Component 545, and Validation Component 550 can be combined or distributed across any number of components.

In an embodiment, the Key Component 540 receives requests (e.g., from a user or the Aggregator 110) to setup the federated learning environment by generating a set of Master Keys 555 and Unique Keys 560. This process can depend, in part, on the number of participants expected, the maximum and/or minimum number of participants allowed, and the like. Once the keys are generated the Distribution Component 545 transmits them to the Participants 120, such that each respective Participant 120 has its own respective Unique Key 560.

The Validation Component 550 receives decryption requests from the Aggregator 110, where the request specifies an aggregation vector. In an embodiment, the Validation Component 550 validates the request by confirming that there is a quorum (e.g., that the number of non-zero weights and/or the number of weights exceeding a predefined minimum threshold, satisfies predefined criteria). In some embodiments, the Validation Component 550 further compares the non-zero weights to each other, to confirm that the difference between each is satisfactory. For example, the Validation Component 550 can confirm that all of the non-zero weights are equal. If the vector is successfully validated, the Validation Component 550 generates and transmits a corresponding secret key to the Aggregator 110. In some embodiments, if the vector is insufficient, the Validation Component 550 rejects it and asks the Aggregator 110 to send another request. Additionally, in at least one embodiment, the Validation Component 550 can notify one or more of the Participants 120 about this failure. This can allow Participants 120 to readily identify an untrustworthy Aggregator 110.

Figure 6:
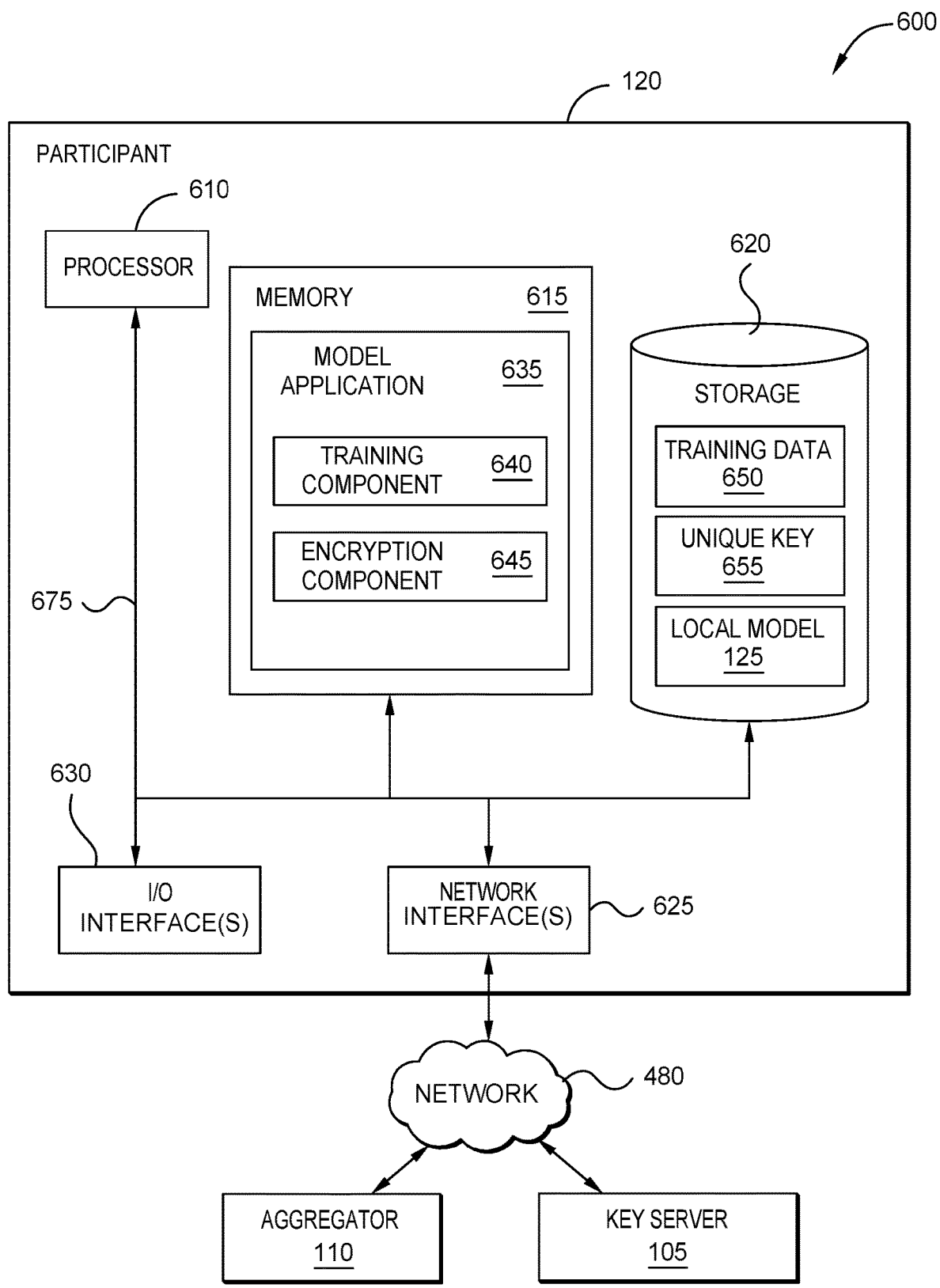
FIG. 6 is a block diagram illustrating a participant in an efficient and secure federated learning environment, according to one embodiment disclosed herein.

FIG. 6 is a block diagram illustrating a Participant 120 in an efficient and secure federated learning environment, according to one embodiment disclosed herein. Although depicted as a physical device, in embodiments, the Participant 120 may be implemented using virtual device(s), and/or across a number of devices (e.g., in a cloud environment). As illustrated, the Participant 120 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Participant 120 can be communicatively coupled with one or more other devices and components (e.g., via the Network 480). As illustrated, the Processor 610, Memory 615, Storage 620, Network Interface(s) 625, and I/O Interface(s) 630 are communicatively coupled by one or more Buses 675. As illustrated, the Participant 120 is communicatively coupled with the Key Server 105 and the Aggregator 110.

In the illustrated embodiment, the Storage 620 includes a set of local Training Data 650, a Unique Key 655, and a Local Model 125. The Training Data 650 generally corresponds to data that the Participant 120 wishes to use to train one or more ML models, such as training exemplars. In embodiments, the federated learning system enables the Participant 120 to use the Training Data 650 to train ML models, while maintaining the privacy and security of the Training Data 650. Although this functionality may be desired for any number of reasons, it is particularly beneficial for Participants 120 that wish to use Training Data 650 including confidential information, trade secrets, data subject to regulatory restrictions (e.g., financial data and healthcare data), and the like.

The Unique Key 655 corresponds to an individual key assigned by the Key Server 105. By using the Unique Key 655, the Participant 120 can ensure that its model parameters cannot be decrypted or evaluated, which could place the security of the Training Data 650 in jeopardy. The Local Model 125 is a local ML model trained by the Participant 120 using the Training Data 650. The Participant 120 can then extract any parameters needed to instantiate the Local Model 125 (e.g., weights for a neural network), encrypt them using the Unique Key 655, and transmit them to the Aggregator 110. In some embodiments, the Participant 120 additionally adds some noise to the parameters prior to encrypting them.

As illustrated, the Memory 615 includes a Model Application 635. Although depicted as software residing in Memory 615, in embodiments, the functionality of the Aggregation Application 635 can be implemented using hardware, software, or a combination of hardware and software. The Model Application 635 includes a Training Component 640 and an Encryption Component 645. Although depicted as discrete components for conceptual clarity, in embodiments, the operations of the Training Component 640 and Encryption Component 645 can be combined or distributed across any number of components.

In an embodiment, the Training Component 640 receives requests from the Aggregator 110, where the request instructs or asks the Training Component 640 to use all or a portion of the local Training Data 650 to train or refine the Local Model 125, using a defined set of parameters and/or hyperparameters. The Training Component 640 then performs this iterative training process. Upon completion of the indicated round of training, the Encryption Component 645 encrypts the model parameters using the Unique Key 125, and transmits the encrypted data back to the Aggregator 110.

Figure 7:
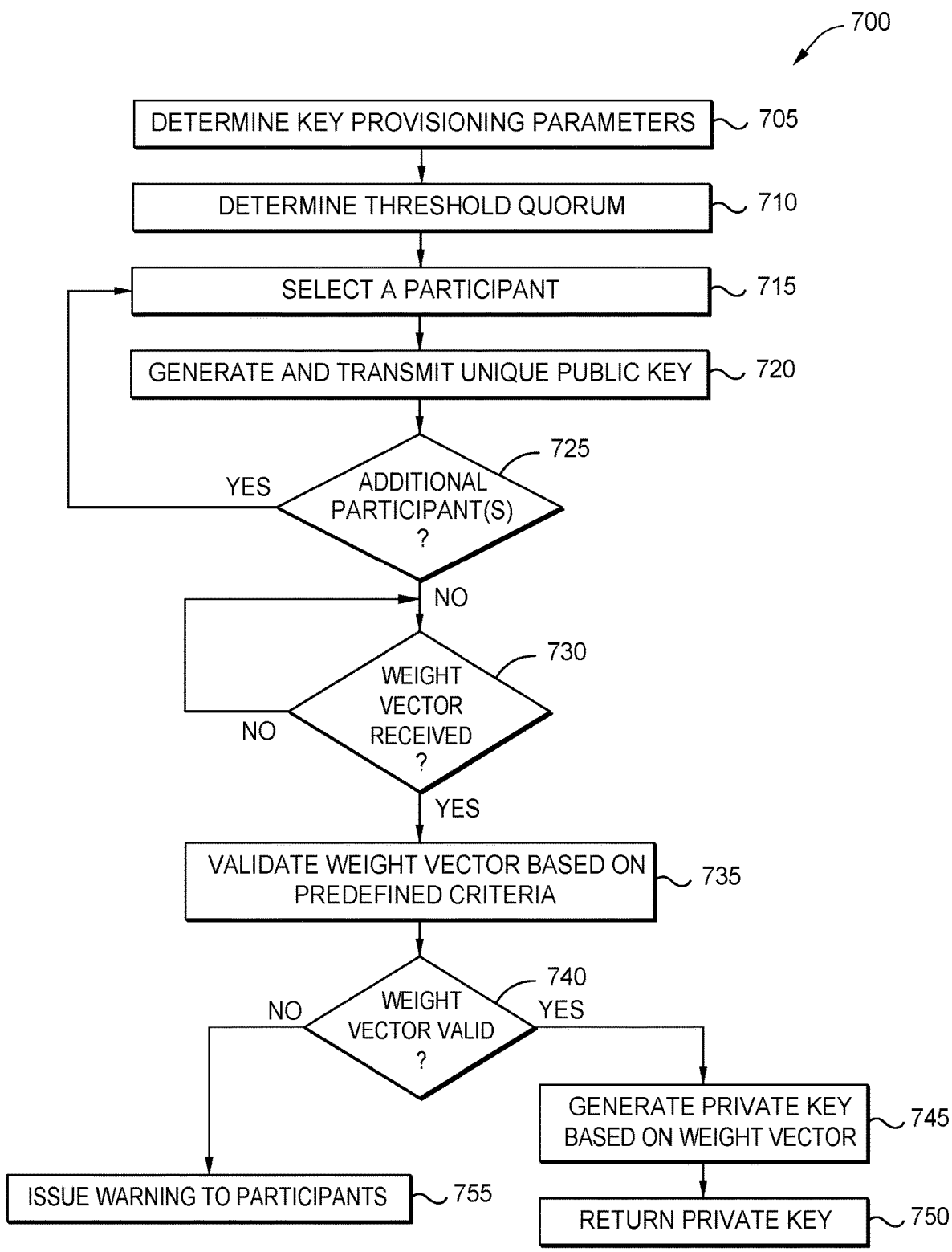
FIG. 7 is a flow diagram illustrating a method for private and efficient federated learning, according to one embodiment disclosed herein.

FIG. 7 is a flow diagram illustrating a method 700 for private and efficient federated learning, according to one embodiment disclosed herein. The method 700 begins at block 705, where a Key Server 105 determines key provisioning parameters for the federated learning environment. In one embodiment, these parameters are specified by a user, and/or provided by an Aggregator 110. In an embodiment, the provisioning parameters include a set of participants (e.g., an identifier and/or address of each participant). The parameters can also include, for example, the expected or requested number of participants (e.g., the number of participants that are currently enrolled to participate), the maximum number of participants (e.g., the maximum number of additional participants that can join after the learning begins), the minimum number of participants (e.g., the maximum number of participants that can drop out of the process), and the like.

At block 710, the Key Server 105 determines the required quorum. In one embodiment, this corresponds to the minimum number of non-zero elements in the aggregation vector. In some embodiments, this value is provided as user input to the system. In at least one embodiment, the required quorum is determined through voting consensus of some or all the Participants 120. The method 700 then proceeds to block 715, where the Key Server 105 selects a participant from the indicated set of participants. At block 720, the Key Server 105 generates and transmits a unique individual key to the selected participant. The method 700 then continues to block 725, where the Key Server 105 determines whether there is at least one additional participant. If so, the method 700 returns to block 715. Otherwise, the method 700 continues to block 730.

At block 730, the Key Server 105 determines whether an aggregate weight vector has been received from the Aggregator 110. If not, in the illustrated embodiment, the method 700 loops at block 730. In some embodiments, the Key Server 105 also listens for and responds to requests to allocate additional keys. For example, if a new participant wishes to join the learning process, the participant and/or the aggregator can request that a unique key be assigned to the participant. The Key Server 105 can respond by determining whether the predefined key parameters allow this addition (e.g., whether any unallocated keys remain, and/or whether the maximum number of new participants has been exceeded). The Key Server 105 can then respond by either returning a key to the new participant, or rejecting the request.

If, at block 730, the Key Server 105 determines that an aggregation vector has been received, the method 700 proceeds to block 735, where the Key Server 105 validates the received vector based on the predefined criteria. In one embodiment, this includes determining the number of non-zero values in the vector, and confirming that this number exceeds the predefined minimum quorum. In a related embodiment, the Key Server 105 can count only the values that exceed a predefined minimum threshold as "non-zero," as a very low value for a given participant can indicate that participant's contributions have an insignificant effect on the result. This may be indicative of attempts to infer the values of a single participant.

Additionally, in at least one embodiment, validating the vector includes evaluating the relative weights of each non-zero value. For example, in one such embodiment, the Key Server 105 confirms that each non-zero weight is equal. In another embodiment, the Key Server 105 confirms that no weights are below a minimum threshold. In still another embodiment, the Key Server 105 confirms that the relative difference in weight between the highest and lowest values does not exceed a threshold. At block 740, the Key Server 105 determines whether the validation was completed successfully.

If the vector failed validation, the method 700 continues to block 755, where the Key Server 105 rejects the vector, refrains from or declines to generate and return a corresponding secret key, and issues a warning to the participants. This warning can allow participants to determine whether they wish to continue to transmit updates to the aggregator, given that it may be compromised. Returning to block 740, if the vector passes validation, the method 700 continues to block 745. At block 745, the Key Server 105 generates a corresponding private key for decrypting the set of participant responses, based on the aggregation vector. At block 750, the Key Server 105 then returns this secret key to the aggregator.

Figure 8:
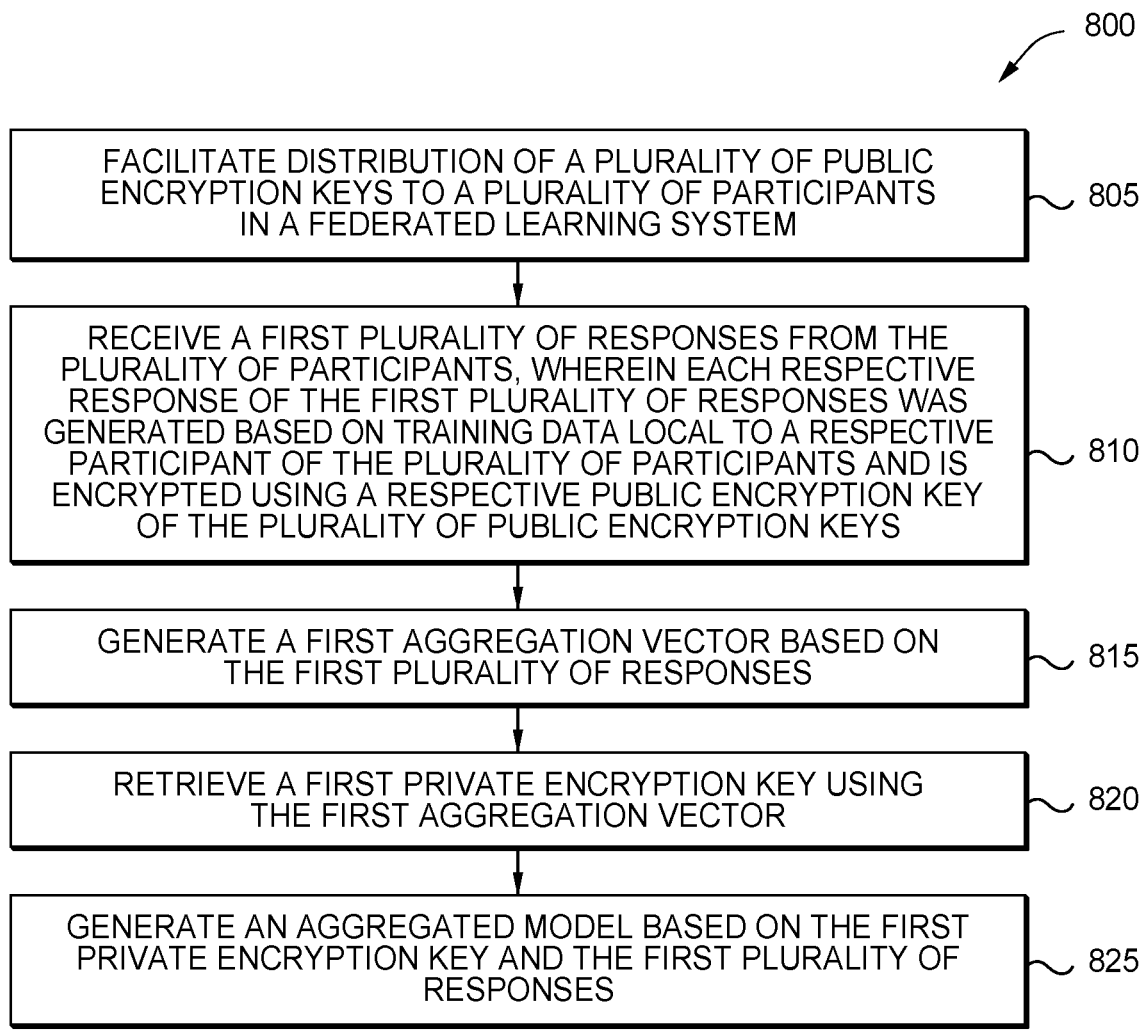
FIG. 8 is a flow diagram illustrating a method for secure and efficient federated learning, according to one embodiment disclosed herein.

FIG. 8 is a flow diagram illustrating a method 800 for secure and efficient federated learning, according to one embodiment disclosed herein. The method 800 begins at block 805, where an Aggregator 110 facilitates distribution of a plurality of public encryption keys to a plurality of participants in a federated learning system. At block 810, the Aggregator 110 receives a first plurality of responses from the plurality of participants, wherein each respective response of the first plurality of responses was generated based on training data local to a respective participant of the plurality of participants and is encrypted using a respective public encryption key of the plurality of public encryption keys. The method 800 then continues to block 815, where the Aggregator 110 generates a first aggregation vector based on the first plurality of responses. Further, at block 820, the Aggregator 110 retrieves a first private encryption key using the first aggregation vector. The method 800 then proceeds to block 825, where the Aggregator 110 generates an aggregated model based on the first private encryption key and the first plurality of responses.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an Aggregation Application 435 and/or Provisioning Application 535) or related data available in the cloud. For example, the Aggregation Application 435 and/or Provisioning Application 535 could execute on a computing system in the cloud and work to generate aggregated ML models. In such a case, the Aggregation Application 435 and/or Provisioning Application 535 could evaluate aggregation vectors, generate decryption keys, train aggregate models, and store the results at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
  facilitating distribution of a plurality of public encryption keys to a plurality of participants in a federated learning system, wherein:
    the plurality of public encryption keys are generated based on a master public encryption key and a master private encryption key,
    the master public encryption key and the master private encryption key are generated by a trusted entity by applying an encryption function using one or more defined key provisioning parameters indicating at least one of: (i) a number of the plurality of participants or (ii) a maximum number of expected participants as inputs to the encryption function, and
    the key provisioning parameters are determined by one or more of the plurality of participants;

receiving a first plurality of responses from the plurality of participants, wherein each respective response of the first plurality of responses comprises machine learning model parameters determined based on training a local machine learning model using data local to a respective participant of the plurality of participants, and wherein each respective response is encrypted using a respective public encryption key of the plurality of public encryption keys;

generating a first aggregation vector based on the first plurality of responses;

upon determining the first aggregation vector satisfies one or more security criteria, retrieving a first private encryption key from the trusted entity using the first aggregation vector; and generating an aggregated machine learning model based on the first private encryption key and the first plurality of responses.

2. The method of claim 1, the method further comprising:

determining that a first participant of the plurality of participants has ceased participation in the federated learning system;

receiving a second plurality of responses from one or more of the plurality of participants, wherein each respective response of the second plurality of responses is encrypted using a respective public encryption key of the plurality of public encryption keys;

generating a second aggregation vector based on the second plurality of responses, wherein the second aggregation vector excludes the first participant;

retrieving a second private encryption key using the second aggregation vector; and refining the aggregated model based on the second private encryption key and the second plurality of responses.

3. The method of claim 1, the method further comprising:

determining that a new participant is beginning participation in the federated learning system, wherein the plurality of public encryption keys includes a first public encryption key that is not in use by any of the plurality of participants; and facilitating distribution of the first public encryption key to the new participant.

4. The method of claim 1, wherein the first aggregation vector defines a respective weighting for each of the plurality of participants.

5. The method of claim 1, wherein the one or more security criteria comprises:

determining a number of non-zero entries in the first aggregation vector; and confirming that the number of non-zero entries in the first aggregation vector exceeds a predefined threshold.

6. The method of claim 5, wherein the one or more security criteria further comprises at least one of:

confirming that each non-zero entry in the first aggregation vector is equal to one divided by the number of non-zero entries in the first aggregation vector, confirming that a weight assigned to each non-zero entry in the first aggregation vector exceeds a weight threshold, or confirming that a difference between a first weight and a second weight does not exceed a difference threshold, wherein the first weight is assigned to a first non-zero entry, of the non-zero entries in the first aggregation vector, with a highest value, and the second weight is assigned to a second non-zero entry, of the non-zero entries in the first aggregation vector, with a lowest value.

7. The method of claim 1, wherein the first private encryption key can be used to determine one or more aggregate values based on the first plurality of responses, wherein an individual value of each of the first plurality of responses remains encrypted.

8. One or more computer-readable storage media collectively containing computer program code that, when executed by operation of one or more computer processors, performs an operation comprising:

facilitating distribution of a plurality of public encryption keys to a plurality of participants in a federated learning system, wherein:

the plurality of public encryption keys are generated based on a master public encryption key and a master private encryption key, and the master public encryption key and the master private encryption key are generated by a trusted entity by applying an encryption function using one or more defined key provisioning parameters indicating at least one of: (i) a number of the plurality of participants or (ii) a maximum number of expected participants as inputs to the encryption function, and the key provisioning parameters are determined by one or more of the plurality of participants;

receiving a first plurality of responses from the plurality of participants, wherein each respective response of the first plurality of responses comprises machine learning model parameters determined based on training a local machine learning model using data local to a respective participant of the plurality of participants, and wherein each respective response is encrypted using a respective public encryption key of the plurality of public encryption keys;

generating a first aggregation vector based on the first plurality of responses;

upon determining the first aggregation vector satisfies one or more security criteria, retrieving a first private encryption key from the trusted entity using the first aggregation vector; and generating an aggregated machine learning model based on the first private encryption key and the first plurality of responses.

9. The one or more computer-readable storage media of claim 8, the operation further comprising:

determining that a first participant of the plurality of participants has ceased participation in the federated learning system;

receiving a second plurality of responses from one or more of the plurality of participants, wherein each respective response of the second plurality of responses is encrypted using a respective public encryption key of the plurality of public encryption keys;

generating a second aggregation vector based on the second plurality of responses, wherein the second aggregation vector excludes the first participant;

retrieving a second private encryption key using the second aggregation vector; and refining the aggregated model based on the second private encryption key and the second plurality of responses.

10. The one or more computer-readable storage media of claim 8, the operation further comprising:

determining that a new participant is beginning participation in the federated learning system, wherein the plurality of public encryption keys includes a first public encryption key that is not in use by any of the plurality of participants; and facilitating distribution of the first public encryption key to the new participant.

11. The one or more computer-readable storage media of claim 8, wherein the first aggregation vector defines a respective weighting for each of the plurality of participants.

12. The one or more computer-readable storage media of claim 8, wherein the one or more security criteria comprises:
   determining a number of non-zero entries in the first aggregation vector; and
   confirming that the number of non-zero entries in the first aggregation vector exceeds a predefined threshold.

13. The one or more computer-readable storage media of claim 12, wherein the one or more security criteria further comprises at least one of:
   confirming that each non-zero entry in the first aggregation vector is equal to one divided by the number of non-zero entries in the first aggregation vector,
   confirming that a weight assigned to each non-zero entry in the first aggregation vector exceeds a weight threshold, or
   confirming that a difference between a first weight and a second weight does not exceed a difference threshold, wherein the first weight is assigned to a first non-zero entry, of the non-zero entries in the first aggregation vector, with a highest value, and the second weight is assigned to a second non-zero entry, of the non-zero entries in the first aggregation vector, with a lowest value.

14. The one or more computer-readable storage media of claim 8, wherein the first private encryption key can be used to determine one or more aggregate values based on the first plurality of responses, wherein an individual value of each of the first plurality of responses remains encrypted.

15. A system comprising:
   one or more computer processors; and
   one or more memories collectively containing one or more programs which when executed by the one or more computer processors performs an operation, the operation comprising:
      facilitating distribution of a plurality of public encryption keys to a plurality of participants in a federated learning system, wherein:
         the plurality of public encryption keys are generated based on a master public encryption key and a master private encryption key,
         the master public encryption key and the master private encryption key are generated by a trusted entity by applying an encryption function using one or more defined key provisioning parameters indicating at least one of: (i) a number of the plurality of participants or (ii) a maximum number of expected participants as inputs to the encryption function, and
         the key provisioning parameters are determined by one or more of the plurality of participants;
      receiving a first plurality of responses from the plurality of participants, wherein each respective response of the first plurality of responses comprises machine learning model parameters determined based on training a local machine learning model using data local to a respective participant of the plurality of participants, and wherein each respective response is encrypted using a respective public encryption key of the plurality of public encryption keys;
      generating a first aggregation vector based on the first plurality of responses;
      upon determining the first aggregation vector satisfies one or more security criteria, retrieving a first private encryption key from the trusted entity using the first aggregation vector; and
      generating an aggregated machine learning model based on the first private encryption key and the first plurality of responses.

16. The system of claim 15, the operation further comprising:
   determining that a first participant of the plurality of participants has ceased participation in the federated learning system; and
   generating the first aggregation vector to exclude the first participant.

17. The system of claim 15, the operation further comprising:
   determining that a new participant is beginning participation in the federated learning system, wherein the plurality of public encryption keys includes a first public encryption key that is not in use by any of the plurality of participants; and
   facilitating distribution of the first public encryption key to the new participant.

18. The system of claim 15, wherein the first aggregation vector comprises non-zero entries and the one or more security criteria comprises:
   determining a number of the non-zero entries in the first aggregation vector; and
   confirming that the number of the non-zero entries in the first aggregation vector exceeds a predefined threshold.

19. The system of claim 18, wherein the one or more security criteria further comprises at least one of:
   confirming that each non-zero entry in the first aggregation vector is equal to one divided by the number of non-zero entries in the first aggregation vector,
   confirming that a weight assigned to each non-zero entry in the first aggregation vector exceeds a weight threshold, or
   confirming that a difference between a first weight and a second weight does not exceed a difference threshold, wherein the first weight is assigned to a first non-zero entry, of the non-zero entries in the first aggregation vector, with a highest value, and the second weight is assigned to a second non-zero entry, of the non-zero entries in the first aggregation vector, with a lowest value.

20. The system of claim 15, wherein each respective participant of the plurality of participants adds noise to its response prior to encrypting it using the corresponding respective encryption key, wherein the noise is determined based at least in part on the plurality of defined key provisioning parameters.

* * * * *